US012802023B2

(12) United States Patent
Mosleh

(10) Patent No.: US 12,802,023 B2
(45) Date of Patent: Nov. 17, 2026

(54) ELECTRONIC DEVICE AND METHOD FOR ASSIGNING TRANSPORTATION PROVIDER THEREOF

(71) Applicant: Coupang Corp., Songpa-gu (KR)

(72) Inventor: Amgd Nasser Ibrahim Mosleh, Seoul (KR)

(73) Assignee: Coupang Corp., Seoul (KR)

( * ) Notice: Subject to any disclaimer, the term of this patent is extended or adjusted under 35 U.S.C. 154(b) by 50 days.

(21) Appl. No.: 18/985,944

(22) Filed: Dec. 18, 2024

(65) Prior Publication Data

US 2025/0292194 A1 Sep. 18, 2025

(30) Foreign Application Priority Data

Mar. 12, 2024 (KR) ........................ 10-2024-0034534

(51) Int. Cl.
*G06Q 10/0834* (2023.01)
*G06Q 10/047* (2023.01)
*G06Q 50/12* (2012.01)

(52) U.S. Cl.
CPC ....... *G06Q 10/0834* (2013.01); *G06Q 10/047* (2013.01); *G06Q 50/12* (2013.01)

(58) Field of Classification Search
CPC .. G06Q 10/0834; G06Q 10/047; G06Q 50/12; G06Q 10/06375; G06Q 10/0838
See application file for complete search history.

(56) References Cited

U.S. PATENT DOCUMENTS

| | | | | |
|---|---|---|---|---|
| 2021/0012287 | A1* | 1/2021 | Han | G06Q 10/0832 |
| 2021/0082291 | A1* | 3/2021 | Villa | G08G 5/34 |
| 2021/0312347 | A1 | 10/2021 | Bian et al. | |
| 2022/0261730 | A1* | 8/2022 | Szybalski | G06Q 10/06315 |

FOREIGN PATENT DOCUMENTS

| | | | |
|---|---|---|---|
| CN | 109214739 | A | 1/2019 |
| CN | 115471023 | A | 12/2022 |
| CN | 115689132 | A | 2/2023 |
| KR | 10-1371091 | B1 | 3/2014 |
| KR | 10-2017-0047669 | A | 5/2017 |
| KR | 10-2018-0042598 | A | 4/2018 |
| KR | 10-1876713 | B1 | 7/2018 |
| KR | 10-2308767 | B1 | 10/2021 |
| KR | 10-2403710 | B1 | 5/2022 |
| KR | 10-2479421 | B1 | 12/2022 |
| KR | 10-2023-0150171 | A | 10/2023 |
| KR | 10-2023-0150174 | A | 10/2023 |
| TW | I823066 | B | 11/2023 |

* cited by examiner

*Primary Examiner* — Rokib Masud
(74) *Attorney, Agent, or Firm* — Fish & Richardson P.C.

(57) ABSTRACT

A method includes: determining an estimated preparation time for a service provider to complete preparation for a request that is received from a terminal of a user; identifying a plurality of transportation providers based on a location of the service provider; determining a first estimated arrival time for a first transportation provider to arrive at the location of the service provider, the first estimated arrival time representing an earliest estimated arrival time among a plurality of estimated arrival times for the plurality of transportation providers; and determining, based on the estimated preparation time and the first estimated arrival time, whether to assign the first transportation provider to the request.

16 Claims, 6 Drawing Sheets

ELECTRONIC DEVICE AND METHOD FOR ASSIGNING TRANSPORTATION PROVIDER THEREOF

TECHNICAL FIELD

The present disclosure relates to a technique for assigning a transportation provider, capable of minimizing the waiting time of transportation providers.

BACKGROUND

In recent years, food delivery services have become increasingly popular, with people ordering food online and having it delivered. To fulfill customer orders quickly and efficiently, it may be important to assign the right transportation provider (e.g., courier) to each order.

SUMMARY

Conventional food delivery systems and applications often face inefficiencies in transportation provider assignment when a customer (e.g., user) orders food from a specific service provider (e.g., a vendor, a food establishment, restaurant, store, market seller, or similar provider). For instance, conventional system or application may assign the idle transportation provider closest to the service provider. However, this approach may result in the transportation provider arriving at the service provider before the food is prepared, leading to extended wait times for the transportation provider and reducing overall delivery efficiency.

Implementations according to the present disclosure address the above-noted issues by introducing methods or algorithms for transportation provider assignment. In an aspect, implementations in the present disclosure address minimizing the transportation provider's wait time at the service provider, ensuring efficient use of the transportation provider's time. Further, in some aspect, implementations in the present disclosure ensure that transportation providers are assigned from nearby locations while simultaneously minimizing their wait time at the service provider. These approaches enhance operational efficiency and significantly reduce potential delays.

According to one aspect of the subject matter described in this application, a method of assigning a transportation provider by an electronic device can include: determining an estimated preparation time for a service provider to complete preparation for a request that is received from a terminal of a user; identifying a plurality of transportation providers based on a location of the service provider; determining a first estimated arrival time for a first transportation provider to arrive at the location of the service provider, the first estimated arrival time representing an earliest estimated arrival time among a plurality of estimated arrival times for the plurality of transportation providers; and determining, based on the estimated preparation time and the first estimated arrival time, whether to assign the first transportation provider to the request.

Implementations according to this aspect can include one or more of the following features. For example, determining whether to assign the first transportation provider to the request can include: determining whether a first difference between the estimated preparation time and the first estimated arrival time is less than or equal to a first reference time; and based on a determination that the first difference is less than or equal to the first reference time, assigning the first transportation provider to the request.

In some examples, determining whether to assign the first transportation provider to the request can further include, based on a determination that the first difference is greater than the first reference time, determining not to assign the first transportation provider to the request.

In some implementations, the method can further include: determining a second estimated arrival time for a second transportation provider to arrive at the location of the service provider, the second estimated arrival time representing a second earliest estimated arrival time among the plurality of estimated arrival times; and based on the estimated preparation time, the first estimated arrival time, and the second estimated arrival time, determining whether to assign the second transportation provider to the request.

In some examples, determining whether to assign the second transportation provider to the request can include: determining whether a second difference between the estimated preparation time and the second estimated arrival time is less than or equal to the first reference time; determining whether a third difference between the first estimated arrival time and the second estimated arrival time is less than or equal to a second reference time; and based on a determination that (i) the second difference is less than or equal to the first reference time and (ii) the third difference is less than or equal to the second reference time, assigning the second transportation provider to the request.

In some implementations, determining whether to assign the second transportation provider to the request can further include, based on a determination that (i) the second difference is greater than the first reference time or (ii) the third difference is greater than the second reference time, determining not to assign the second transportation provider to the request.

In some implementations, determining whether to assign the second transportation provider to the request can further include, based on a determination that (i) the second difference is greater than the first reference time or (ii) the third difference is greater than the second reference time, determining not to assign the second transportation provider to the request.

In some examples, the first transportation provider can be a transportation provider with a shortest distance to the location of the service provider among the plurality of transportation providers, and the second transportation provider can be a transportation provider with a second shortest distance to the location of the service provider among the plurality of transportation providers.

In some implementations, the method can further include, based on a determination that the second transportation provider is not assigned to the request, reidentifying a plurality of transportation providers based on the location of the service provider.

In some examples, identifying the plurality of transportation providers can include identifying transportation providers that are (i) located within a predetermined radius from the location of the service provider and (ii) in an idle state.

In some implementations, the method can further include: determining an estimated arrival time for each of the plurality of transportation providers to arrive at the location of the service provider; based on the estimated preparation time, the estimated arrival time of each of the plurality of transportation providers, and a first reference time, determining not to assign, one or more transportation providers among the plurality of transportation providers, to the request; and based on the estimated preparation time and the estimated arrival time of each of remaining transportation providers, determining one transportation provider to be assigned to the request among the plurality of transportation providers excluding the one or more transportation providers.

In some implementations, the method can further include: identifying whether a first difference between the estimated preparation time and the first estimated arrival time is greater than a first reference time; based on (i) the first difference between the estimated preparation time and the first estimated arrival time being greater than the first reference time, (ii) the first estimated arrival time, (iii) a delay time, and (iv) an acceptance rate of the first transportation provider regarding previous requests accepted for delivery, calculating a delay score; and based on the delay score, determining whether to assign the first transportation provider to the request.

In some implementations, the first estimated arrival time can be determined based on at least one of (i) a distance from the location of the service provider to a location of the first transportation provider, (ii) an average speed of the first transportation provider, (iii) characteristic information of the first transportation provider, (iv) characteristic information of a product corresponding to the request, (v) a current time, (vi) a current date, or (vii) traffic situation information.

In some implementations, identifying the plurality of transportation providers can include, in response to a determination that the estimated preparation time is less than or equal to a threshold time, identifying the plurality of transportation providers based on the location of the service provider.

According to another aspect of the subject matter described in this application, an electronic device includes a memory storing instructions and a processor configured to execute the instructions to perform operations. The operations can include: determining an estimated preparation time for a service provider to complete preparation for a request that is received from a terminal of a user; identifying a plurality of transportation providers based on a location of the service provider; determining a first estimated arrival time for a first transportation provider to arrive at the location of the service provider, the first estimated arrival time representing an earliest estimated arrival time among a plurality of estimated arrival times for the plurality of transportation providers; and determining, based on the estimated preparation time and the first estimated arrival time, whether to assign the first transportation provider to the request.

In some implementations, determining whether to assign the first transportation provider to the request can include: determining whether a first difference between the estimated preparation time and the first estimated arrival time is less than or equal to a first reference time; and based on a determination that the first difference is less than or equal to the first reference time, assigning the first transportation provider to the request.

In some implementations, determining whether to assign the first transportation provider to the request can further include, based on a determination that the first difference is greater than the first reference time, determining not to assign the first transportation provider to the request.

In some implementations, the operations can further include: determining a second estimated arrival time for a second transportation provider to arrive at the location of the service provider, the second estimated arrival time representing a second earliest estimated arrival time among the plurality of estimated arrival times; and based on the estimated preparation time, the first estimated arrival time, and the second estimated arrival time, determining whether to assign the second transportation provider to the request.

In some implementations, determining whether to assign the second transportation provider to the request can include: determining whether a second difference between the estimated preparation time and the second estimated arrival time is less than or equal to the first reference time; determining whether a third difference between the first estimated arrival time and the second estimated arrival time is less than or equal to a second reference time; and based on a determination that (i) the second difference is less than or equal to the first reference time and (ii) the third difference is less than or equal to the second reference time, assigning the second transportation provider to the request.

In some implementations, determining whether to assign the second transportation provider to the request further can include, based on a determination that (i) the second difference is greater than the first reference time or (ii) the third difference is greater than the second reference time, determining not to assign the second transportation provider to the request.

According to another aspect of the subject matter described in this application, a non-transitory recording medium storing a program, where execution of the program can cause one or more computers to perform operations including: determining an estimated preparation time for a service provider to complete preparation for a request that is received from a terminal of a user; identifying a plurality of transportation providers based on a location of the service provider; determining a first estimated arrival time for a first transportation provider to arrive at the service provider, the first estimated arrival time representing an earliest estimated arrival time among a plurality of estimated arrival times for the plurality of transportation providers; and determining, based on the estimated preparation time and the first estimated arrival time, whether to assign the first transportation provider to the request.

DETAILED DESCRIPTION

Figure 1:
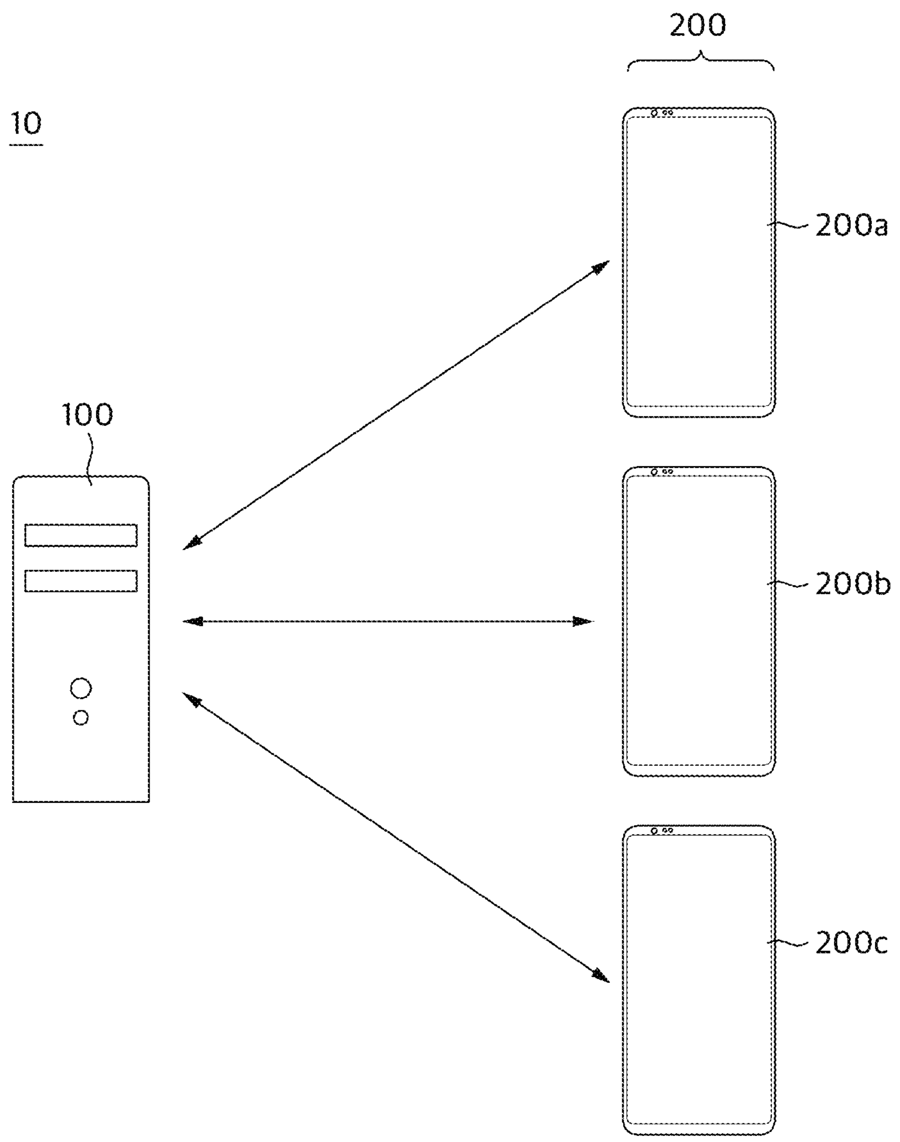
FIG. 1 is a diagram illustrating an example of a system.

FIG. 1 is a diagram illustrating an example of a system 10. The system 10 disclosed herein can be a system 10 associated with an e-commerce service. The e-commerce service can be a delivery platform service that mediates between service providers and buyers online to order and deliver food.

In some examples, the system 10 can include an electronic device 100 and terminals 200.

In some implementations, the electronic device 100 can be a server for operating an e-commerce service. The electronic device 100 can be a front-end server that provides a Graphical User Interface (GUI) environment to the terminals 200. The electronic device 100 can be a server for providing a webpage or application that is visible to users. The electronic device 100 can operate an application or web page related to the delivery platform service. The electronic device 100 can manage various programs (software) for operating the delivery platform service. The electronic device 100 can be in communication with the terminal 200 to send and receive various information. The electronic device 100 can obtain various information related to the delivery application from the terminal 200 and provide it to other devices.

The terminals 200 can include a terminal 200*a* of a customer (customer terminal), a terminal 200*b* of a service provider (service provider terminal), and a terminal 200*c* of a transportation provider (transportation provider terminal). Each of the customer terminal 200*a*, the service provider terminal 200*b*, and the transportation provider terminal 200*c* can be in communication with the electronic device 100 to send and receive various information.

The customer terminal 200*a* can be a terminal device of a buyer ordering food. Through the customer terminal 200*a*, the customer can access a delivery application, search for a desired service provider or menu, and thereby order a desired food from the desired service provider. The service provider terminal 200*b* can be a terminal device located in the service provider. The service provider terminal 200*b* can be a device that enables an employee of the service provider to receive orders related to the service provider from customers via the corresponding application, and to accept or reject the orders received. Using the service provider terminal 200*b*, the employee of the service provider can check the customer's order and decide whether to accept the order. The service provider employee can request the assignment of a transportation provider to the electronic device 100 via the service provider terminal 200*b*. The transportation provider terminal 200*c* can be a terminal device used by a transportation provider. The transportation provider can be assigned an order via the transportation provider terminal 200*c*. When the transportation provider is assigned an order, the transportation provider can pick up the food from the service provider corresponding to the order and deliver the food to the address set by the customer.

Figure 2:
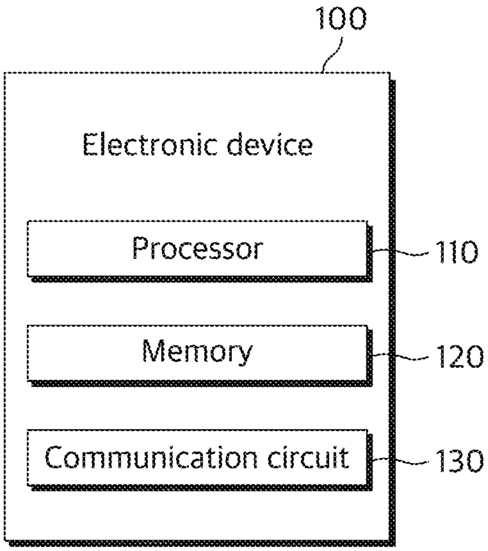
FIG. 2 is a diagram illustrating an example of an electronic device.

FIG. 2 is a diagram illustrating an example of an electronic device 100. The electronic device 100 can include a processor 110, a memory 120, and a communication circuit 130. At least one of the components included in the electronic device 100 can be omitted, or other components can be added to the electronic device 100. Additionally or alternatively, some of the components can be integrated, or can be implemented as a single or plurality of entities. At least some of the components in the electronic device 100 can be integrated, or can be implemented as a single or plurality of entities. At least some of the components within the electronic device 100 can be connected to each other via a bus, general purpose input/output (GPIO), serial peripheral interface (SPI), mobile industry processor interface (MIPI), or the like to send and receive data and/or signals.

The processor 110 of the electronic device 100 can be operatively coupled to the components of the electronic device 100 in a configuration that is capable of performing operations or data processing related to the control and/or communication of the respective components of the electronic device 100. The processor 110 can load instructions or data received from different components of the electronic device 100 into the memory 120, process the instructions or data stored in the memory 120, and store the resulting data. In the present disclosure, the processor 110 can refer to a set of one or more processors 110, unless otherwise noted.

The memory 120 of the electronic device 100 can store various data used by at least one component (e.g., the processor 110). The memory 120 can store instructions for operation of the processor 110 as described above. Programs can be stored in the memory 120 as software, and can include, for example, an operating system, middleware, or application. In the present disclosure, the memory 120 can refer to a set of one or more memories 120, unless otherwise noted.

The communication circuit 130 of the electronic device 100 can establish a wired or wireless communication channel with an external device (e.g., customer terminal 200), and can transmit and receive various data to and from the external device. The communication circuit 130 of the electronic device 100 can include at least one port for wired communication with an external device, for example, a wired cable connection with the external device. The communication circuit 130 of the electronic device 100 can include a cellular communication module and can be configured to connect to a cellular network (e.g., 3G, LTE, 5G, Wibro, or Wimax). In some implementations, the communication circuit 130 of the electronic device 100 can include a local area network module to transmit and receive data to and from an external device using local area network communication (e.g., Wi-Fi, Bluetooth, Bluetooth Low Energy (BLE), UWB), but is not limited to.

In some examples, a customer can run a delivery application through the customer terminal 200. The customer can check information about a plurality of service providers in the delivery application. In some implementations, the customer can search in the delivery application by entering a desired menu name, a desired franchise name, or a desired food category name.

Figure 3:
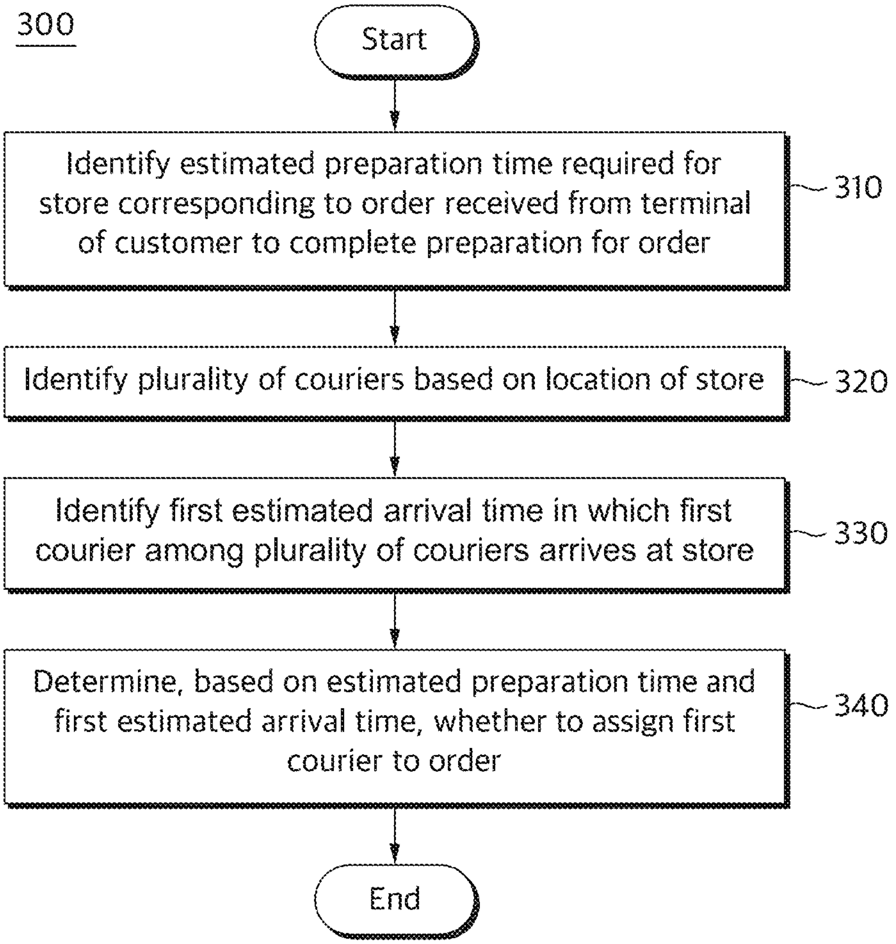
FIGS. 3-6 are flowchart diagrams illustrating examples of processes for determining an assignment of a transportation provider to an order.

FIG. 3 is a flowchart diagram 300 illustrating an example of a process for determining an assignment of a transportation provider to an order. Specifically, the flowchart diagram 300 illustrates an example for determining whether to assign a transportation provider to an order received from a customer terminal. The flowchart diagram 300 can be implemented by a processor-based system, such as the electronic device 100.

The processor 110 of the electronic device 100 can determine whether a just in time (JIT) rule is satisfied in order to determine whether to assign a particular transportation provider to the order. The JIT rule can refer to a rule for determining whether a transportation provider arrives at a service provider in a timely manner to pick up food. The JIT rule can be checked using the following Equation 1.

$$TPT - T_1 \leq T_{ST1} \quad \text{[Equation 1]}$$

TPT (target pick-up time) can refer to an estimated preparation time for the service provider to complete preparation for the order. That is, the TPT can refer to the estimated preparation time for the service provider to complete the preparation of the food corresponding to the order, aligning with the time the transportation provider is expected to arrive to pick up the food from the service provider. $T_1$ can be an estimated arrival time for the transportation provider to arrive at the service provider. $T_{ST1}$ can be a first reference time, which can be a predetermined time. FIG. 3 is a flowchart diagram illustrating an example of a process of checking whether a JIT rule is satisfied in order to determine whether to assign a first transportation provider to an order received from a customer terminal 200. As used herein, JIT time ($T_{JIT}$) can be TPT-$T_1$.

Referring to the flowchart diagram 300, the processor 110 of the electronic device 100 can, in operation 310, identify the estimated preparation time (i.e., TPT of the JIT rule) required for the service provider corresponding to the order received from the customer terminal 200 to complete preparation for the order. In some examples, the customer can use the customer terminal 200 to run the application and can, through the application, order the desired food from the desired service provider. The processor 110 can receive order information including the service provider, food ordered, order time, and customer information (e.g., delivery address) from the customer terminal 200. Based on the order information, the processor 110 can identify the service provider corresponding to the order.

The processor 110 can identify the estimated preparation time required for the service provider corresponding to the order to complete preparation for the order. For example, the processor 110 can identify the estimated preparation time required for the service provider corresponding to the order to complete the food ordered.

In some implementations, an employee of the service provider can enter the estimated preparation time to complete preparation for the order via the service provider terminal 200. For example, the employee can enter an estimated preparation time of 20 minutes to complete the food corresponding to the order via the service provider terminal 200.

In some implementations, the processor 110 can automatically determine the estimated preparation time based on the food corresponding to the order. For example, the processor 110 can determine the estimated preparation time as 20 minutes, which is determined as a default value for pasta, if the food corresponding to the order is pasta. The estimated preparation time can be determined based on at least one of the type of food corresponding to the order, the amount of food, or the current state of the service provider. The current state of the service provider can mean, for example, information about how busy the service provider is at the moment.

In operation 320, the processor 110 can identify a plurality of transportation providers based on the location of the service provider. The processor 110 can identify a plurality of transportation providers based on the location of the service provider upon receiving a request from the service provider terminal 200 to dispatch a transportation provider. The processor 110 can identify a plurality of transportation providers that are located within a predetermined radius based on the location of the service provider and currently in an idle state. For example, the processor 110 can identify a plurality of idle transportation providers located within one kilometer radius based on the location of the service provider. The certain radius can be set as a default value, or can be set in consideration of the current time, weather, or traffic conditions.

In some implementations, the processor 110 can identify a plurality of transportation providers based on the location of the service provider in response to the estimated preparation time being below a threshold time. For example, the processor 110 can identify a plurality of transportation providers based on the location of the service provider if the estimated preparation time is 10 minutes or less. If the estimated preparation time is 15 minutes, the processor 110 can identify a plurality of transportation providers when 5 minutes have elapsed and the remaining estimated preparation time is 10 minutes or less. That is, the transportation provider assignment algorithm can start when the estimated preparation time is below a threshold time, instead of starting when the order is received.

In operation 330, the processor 110 can identify a first estimated arrival time (i.e., $T_1$ of the JIT rule) in which a first transportation provider among the plurality of transportation providers arrives at the service provider. The first transportation provider can be the closest transportation provider to the location of the service provider among the plurality of transportation providers. The first estimated arrival time can be an estimated arrival time for the first transportation provider to arrive at the service provider.

In some implementations, the processor 110 can determine the first estimated arrival time based on at least one of a distance from the location of the service provider to a location of the first transportation provider, an average speed of the first transportation provider, characteristic information of the first transportation provider, characteristic information of a product corresponding to the order, a current time, a current date, and traffic situation information. The estimated arrival time can be calculated using the following Equation 2.

$$T_1 = T_{travel} + T_{Lastmile} \quad \text{[Equation 2]}$$

where, $T_1$ can be an estimated arrival time for the transportation provider to arrive the service provider, and $T_{travel}$ can be a travel time of the transportation provider. $T_{travel}$ can be a distance traveled from the transportation provider's current location to the service provider divided by the average travel speed of the transportation provider. The average travel speed of the transportation provider can be determined based on the transportation provider's mode of transportation (e.g., car, motorbike, bicycle, walking), or can be a value calculated based on the transportation provider's past record of making deliveries. $T_{lastmile}$ can be a time determined based on at least one of a straight-line distance from the location of the transportation provider to the service provider with 100 m remaining to travel to the service provider, characteristic information of the transportation provider, characteristic information of the product corresponding to the order, the current time, the current date, and traffic situation information. The characteristic information of the transportation provider can refer to a mode of transportation of the transportation provider.

The processor 110 can determine, in operation 340, whether to assign the first transportation provider to the order based on the estimated preparation time and the first estimated arrival time. In some examples, the processor 110 can determine whether to assign the first transportation provider to the order based on whether the first transportation provider satisfies the JIT rule corresponding to the above Equation 1. The processor 110 can identify whether the difference between the estimated preparation time (TPT in the JIT rule) and the first estimated arrival time ($T_1$ in the JIT rule) is less than or equal to a predetermined first reference time ($T_{ST1}$). The first reference time can be, for example, 2 minutes.

In some implementations, the processor 110 can assign the first transportation provider to the order if the difference between the estimated preparation time and the first estimated arrival time is less than or equal to the first reference time. That is, if the first transportation provider satisfies the JIT rule, the processor 110 can determine that the first transportation provider is the most appropriate transportation provider for the order and assign the first transportation provider to the order. The first transportation provider can check and accept the assignment of the order via the terminal 200 of the first transportation provider.

In some implementations, the processor 110 can determine not to assign the first transportation provider to the order if the difference between the estimated preparation time and the first estimated arrival time exceeds the first reference time. That is, if the first transportation provider does not satisfy the JIT rule, the processor 110 can exclude the first transportation provider from being assigned to the order. The processor 110 can search for another transportation provider to assign to the order.

Figure 4:
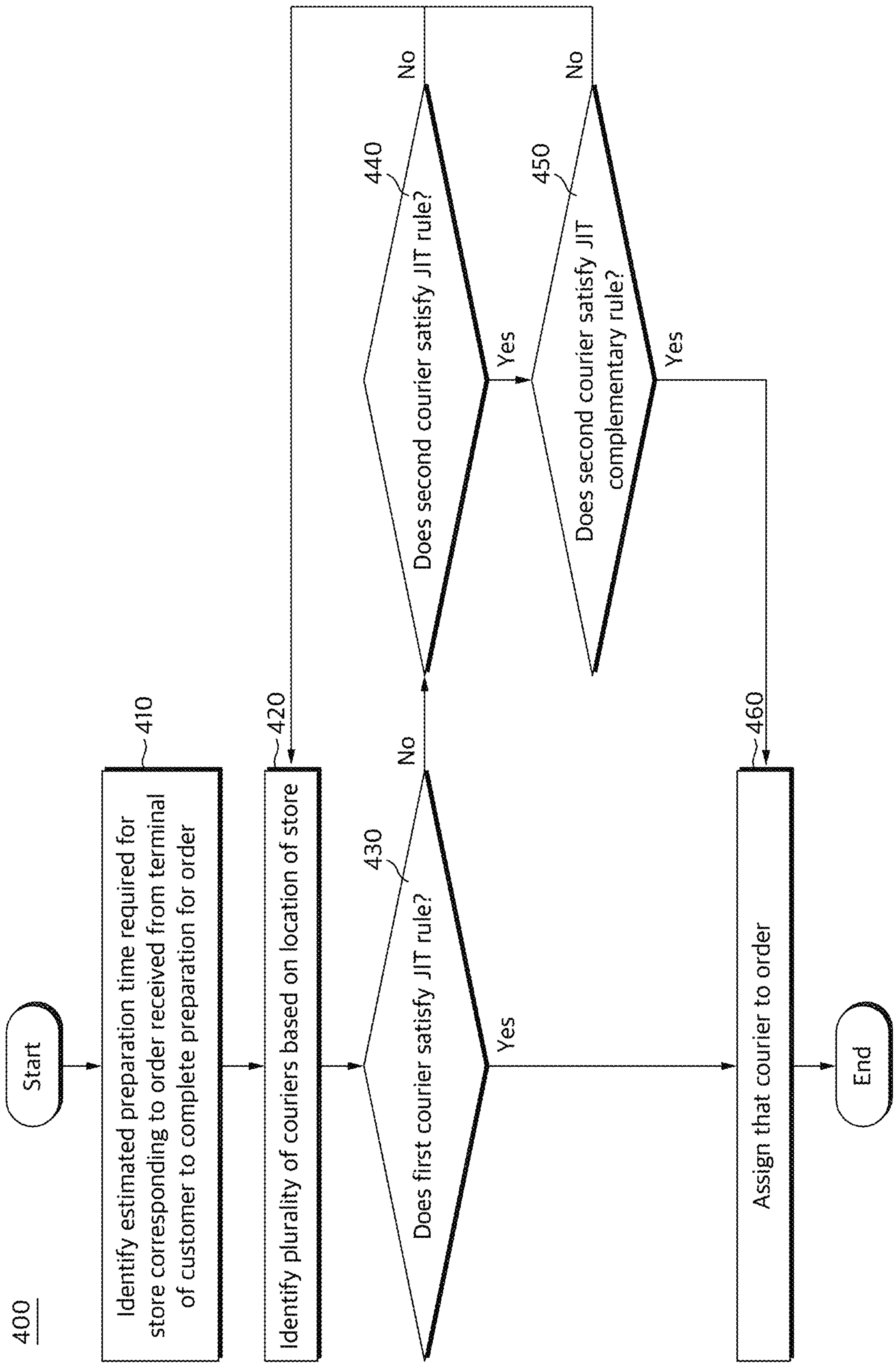

FIG. 4 is a flowchart diagram 400 of an electronic device 100 illustrating an example of a process for determining an assignment of a transportation provider to an order. Specifically, the flowchart diagram 400 illustrates an algorithm for assigning a transportation provider to an order received from a customer terminal 200. The flowchart diagram 400 can be implemented by a processor-based system, such as the electronic device 100. Description that is redundant to what has already been described in FIG. 3 will be omitted.

Referring to the flowchart diagram 400, the processor 110 of the electronic device 100 can, in operation 410, identify an estimated preparation time required for a service provider corresponding to an order received from the customer terminal 200 to complete preparation for the order. The processor 110 can identify the estimated preparation time required for the service provider corresponding to the order to complete preparation for the order. For example, the processor 110 can identify the estimated preparation time required for the service provider corresponding to the order to complete the food ordered.

In operation 420, the processor 110 can identify a plurality of transportation providers based on the location of the service provider. The processor 110 can identify a plurality of transportation providers that are located within a predetermined radius based on the location of the service provider and currently in an idle state.

In operation 430, the processor 110 can determine whether the first transportation provider satisfies the JIT rule. The first transportation provider can be the transportation provider closest to the location of the service provider among the plurality of transportation providers. In some examples, the processor 110 can determine, for the first transportation provider, whether Equation 1 corresponding to the JIT rule is satisfied. Specifically, the processor 110 can identify a first estimated arrival time for the first transportation provider to arrive at the service provider, and determine whether the difference between the estimated preparation time and the first estimated arrival time is less than or equal to a predetermined first reference time. In some examples, the first reference time can be, for example, 2 minutes. The processor 110 can determine that the first transportation provider satisfies the JIT rule if the difference between the estimated preparation time and the first estimated arrival time is less than or equal to the first reference time. The processor 110 can determine that the first transportation provider does not satisfy the JIT rule if the difference between the estimated preparation time and the first estimated arrival time exceeds the first reference time.

If the processor 110 determines that the first transportation provider satisfies the JIT rule, it branches to operation 460 (operation 430→Yes), and the processor 110 can assign the first transportation provider to the order.

If the processor 110 determines that the first transportation provider does not satisfy the JIT rule, it branches to operation 440 (operation 430→No), where the processor 110 can determine whether the second transportation provider satisfies the JIT rule. If the processor 110 determines that the first transportation provider does not satisfy the JIT rule, the processor 110 can exclude the first transportation provider. In order to assign the second transportation provider to the order, the second transportation provider needs to satisfy the JIT rule and the JIT complementary rule. The second transportation provider can be the second-closest transportation provider to the location of the service provider among the plurality of identified transportation providers. In other words, the processor 110 can exclude the first transportation provider from the candidates for assignment to the order in this round, and then determine whether the second transportation provider who is next closest after the first transportation provider satisfies the JIT rule.

To determine whether the second transportation provider satisfies the JIT rule, the processor 110 can identify a second estimated arrival time for the second transportation provider to arrive at the service provider. Based on the estimated preparation time, the first estimated arrival time, and the second estimated arrival time, the processor 110 can determine whether to assign the second transportation provider to the order. Specifically, the processor 110 can determine whether the difference between the estimated preparation time for the service provider to complete preparation for the order and the second estimated arrival time for the second transportation provider to arrive at the service provider is less than or equal to the first reference time. If the difference between the estimated preparation time and the second estimated arrival time is less than or equal to the first reference time, the processor 110 can determine that the second transportation provider satisfies the JIT rule. If the difference between the estimated preparation time and the second estimated arrival time exceeds the first reference time, the processor 110 can determine that the second transportation provider does not satisfy the JIT rule.

If the processor 110 determines that the second transportation provider does not satisfy the JIT rule, it branches to operation 420 (operation 440→No) and the processor 110 can again identify a plurality of transportation providers based on the location of the service provider. In other words, if the processor 110 determines that the second transportation provider does not satisfy the JIT rule, the processor 110 can stop (or abandon) assigning the transportation provider in the current round and move on to the next round. That is, the processor 110 can stop assigning one of the plurality of identified transportation providers to the order, and can again identify a plurality of transportation providers based on the current time.

If the processor 110 determines that the second transportation provider satisfies the JIT rule, it branches to operation 450 (operation 440→Yes), where the processor 110 can determine whether the second transportation provider satisfies the JIT complementary rule. The JIT complementary rule is a rule for complementing the JIT rule, which can refer to the following Equation 3.

$$\Delta T_1 = |T_{1,EDP1} - T_{1,EDP2}| \leq T_{ST2} \quad \text{[Equation 3]}$$

where, $\Delta T_1$ can refer to a difference between the first estimated arrival time of the first transportation provider and the second estimated arrival time of the second transportation provider, $T_{1,EDP1}$ can refer to a first estimated arrival time of the first transportation provider, and $T_{2,EDP2}$ can refer to a second estimated arrival time of the second transportation provider. $T_{ST2}$ can refer to a second reference time, which can be a predetermined time. That is, the processor 110 can determine that the second transportation provider satisfies the JIT complementary rule if the difference between the first estimated arrival time and the second estimated arrival time is less than or equal to the second reference time. The processor 110 can determine that the second transportation provider does not satisfy the JIT complementary rule if the difference between the first estimated arrival time and the second estimated arrival time exceeds the second reference time.

If the processor 110 determines that the second transportation provider satisfies the JIT complementary rule, it branches to operation 460 (operation 450→Yes), where the processor 110 can assign the second transportation provider to the order. In other words, if the second transportation provider satisfies both the JIT rule and the JIT complementary rule, the second transportation provider can be assigned to the order. That is, the second transportation provider satisfying the JIT complementary rule is located further from the service provider than the first transportation provider, but the actual arrival time at the service provider is not significantly different from that of the first transportation provider, and the second transportation provider can be assigned to the order.

If the processor 110 determines that the second transportation provider does not satisfy the JIT complementarity rule, it branches to operation 420 (operation 450→No) and the processor 110 can again identify a plurality of transportation providers based on the location of the service provider. That is, if the processor 110 determines that the second transportation provider does not satisfy the JIT complementarity rule, the processor 110 can stop (or abandon) assigning transportation providers in the current round and move on to the next round. The processor 110 can stop assigning one of the plurality of identified transportation providers to the order, and can again identify a plurality of transportation providers based on the current time.

In some examples where the estimated preparation time required for the service provider to complete preparation for the order is 7 minutes, the first estimated arrival time for the first transportation provider to arrive at the service provider can be 3 minutes, and the second estimated arrival time for the second transportation provider to arrive at the service provider can be 5 minutes. Further, for illustrative purposes, assuming that the first reference time for the JIT rule is 2 minutes and the second reference time for the JIT complementary rule is 3 minutes, below determination can be made.

In the above example, the JIT time ($T_{JIT}$) of the first transportation provider is 4 minutes (=7−3), which exceeds the first reference time, so the processor 110 can determine that the first transportation provider does not satisfy the JIT rule. Therefore, the processor 110 can exclude the first transportation provider from the transportation provider assignment algorithm.

Moreover, in the above example, since the JIT time ($T_{JIT}$) of the second transportation provider is 2 minutes (=7−5), the processor 110 can determine that the JIT rule is satisfied. Accordingly, the processor 110 can determine whether the second transportation provider satisfies the JIT complementary rule. Since the difference between the first estimated arrival time of the first transportation provider and the second estimated arrival time of the second transportation provider is 2 minute, which is below the second reference time, the processor 110 can determine that the second transportation provider satisfies the JIT complementary rule. That is, the second transportation provider satisfies both the JIT rule and the JIT complementary rule, and the processor 110 can assign the second transportation provider to the order.

Figure 5:
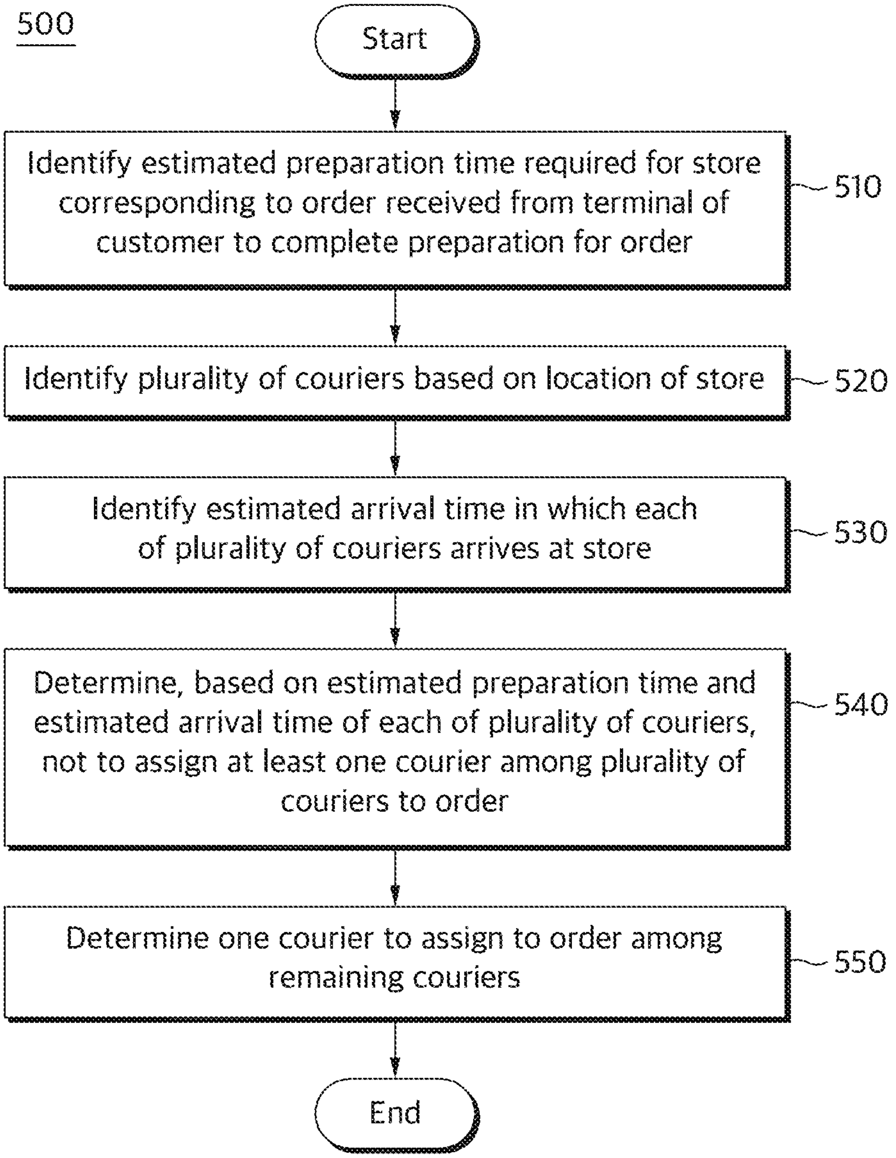

FIG. 5 is a flowchart diagram 500 illustrating an example of a process for determining an assignment of a transportation provider to an order. The flowchart diagram 500 can be implemented by a processor-based system, such as the electronic device 100. Description that is redundant to what has already been described in FIGS. 3 and 4 will be omitted.

Referring to the flowchart diagram 500, the processor 110 of the electronic device 100 can, in operation 510, identify an estimated preparation time required for the service provider corresponding to the order received from the customer terminal 200 to complete preparation for the order. The processor 110 can identify the estimated preparation time required for the service provider corresponding to the order to complete preparation for the order. For example, the processor 110 can identify the estimated preparation time required for the service provider corresponding to the order to complete the food ordered.

The processor 110 can, in operation 520, identify a plurality of transportation providers based on the location of the service provider. The processor 110 can identify a plurality of transportation providers that are located within a predetermined radius based on the location of the service provider and currently in an idle state.

In operation 530, the processor 110 can identify an estimated arrival time in which each of the plurality of transportation providers arrives at the service provider. That is, the processor 110 can identify the estimated arrival times for all of the plurality of identified transportation providers to arrive at the service provider, respectively.

The processor 110 can determine, in operation 540, not to assign at least one of the plurality of transportation providers to the order based on the estimated preparation time and the estimated arrival time of each of the plurality of transportation providers. Specifically, the processor 110 can determine, for each of the plurality of transportation providers, whether the JIT rule is satisfied. That is, the processor 110 can determine, for each of the plurality of transportation providers, whether the JIT rule is satisfied by determining whether the difference between the estimated preparation time and the estimated arrival time of each of the plurality of transportation providers is less than or equal to the first reference time. The processor 110 can determine not to assign the order to the at least one transportation provider who does not satisfy the JIT rule among the plurality of transportation providers. That is, the processor 110 can exclude the at least one transportation provider who does not satisfy the JIT rule among the plurality of transportation providers from being assigned to the order.

The processor 110 can, in operation 550, determine one transportation provider to whom to assign the order among the remaining transportation providers, excluding the at least one transportation provider of the plurality of transportation providers. In some examples, the processor 110 can assign the one transportation provider whose difference between the estimated arrival time and the estimated preparation time is closest to zero among the remaining transportation providers to the order. That is, the processor 110 can assign the one transportation provider whose JIT time ($T_{JIT}$) is closest to zero among the remaining transportation providers to the order. In an example implementation, the processor 110 can assign the one transportation provider with the smallest estimated arrival time among the remaining transportation providers to the order. According to an example implementation, the processor 110 can also assign the one transportation provider with the closest distance to the service provider among the remaining transportation providers to the order.

Figure 6:
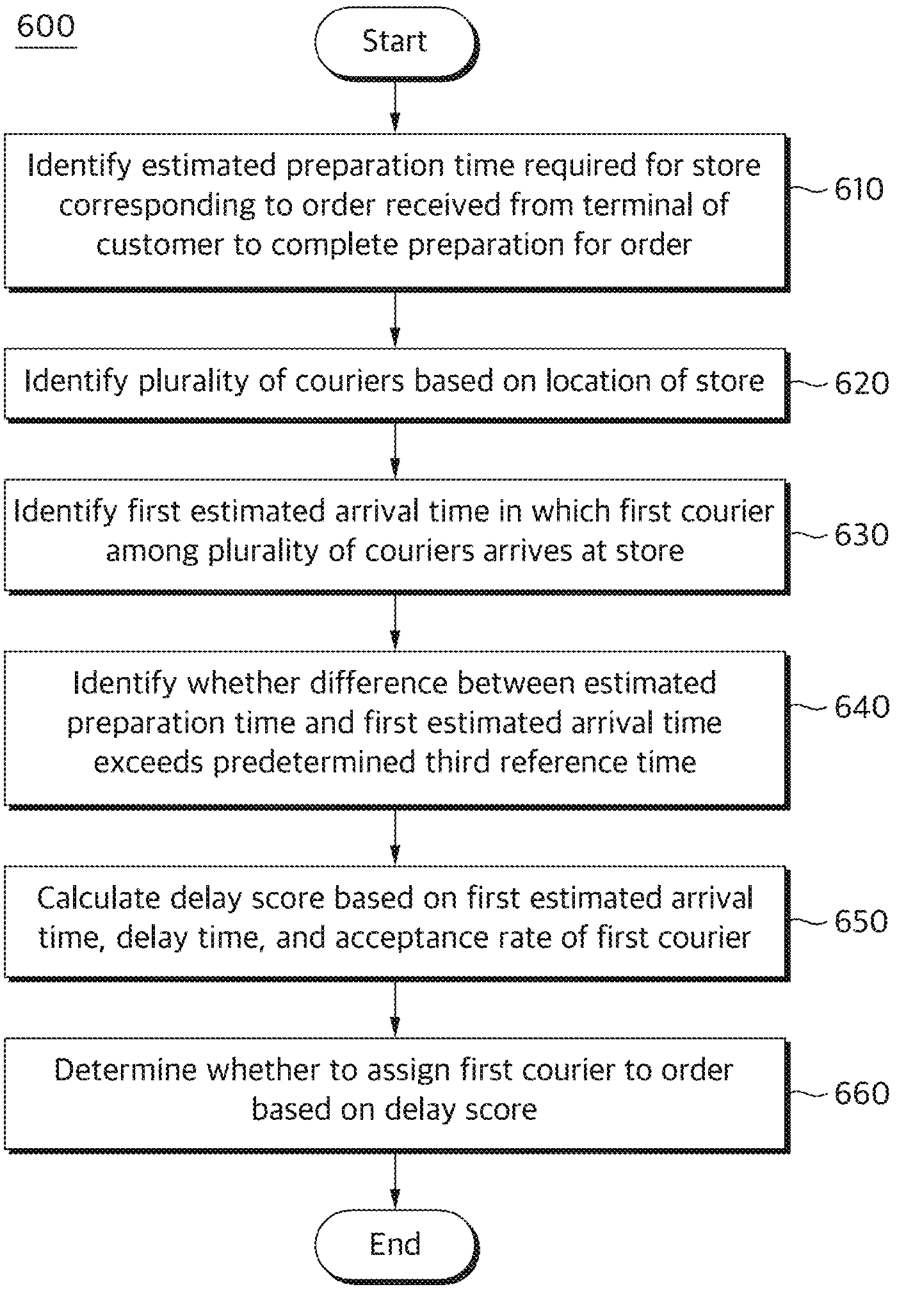

FIG. 6 is a flowchart diagram 600 illustrating an example of a process for determining an assignment of a transportation provider to an order. Specifically, the flowchart diagram 600 illustrates a boosting mechanism. The flowchart diagram 600 can be implemented by a processor-based system, such as the electronic device 100. Description that is redundant to what has already been described in FIGS. 3 to 5 will be omitted.

Referring to the flowchart diagram 600, the processor 110 of the electronic device 100 according to an example implementation can identify, in operation 610, an estimated preparation time required for a service provider corresponding to an order received from a customer terminal 200 to complete preparation for the order. The processor 110 according to an example implementation can, in operation 620, identify a plurality of transportation provider based on the location of the service provider. The processor 110 according to an example implementation can, in operation 630, identify a first estimated arrival time in which a first transportation provider among the plurality of transportation providers arrives at the service provider.

In operation 640, the processor 110 can identify whether the difference between the estimated preparation time and the first estimated arrival time exceeds a predetermined third reference time. The third reference time can be a reference time for determining whether to carry out the boosting mechanism, which can be a predetermined time. The third reference time can be, for example, 5 minutes. The third reference time can be different from the first reference time applied to the JIT rule.

The processor 110 can, in operation 650, calculate a delay score based on the first estimated arrival time, delay time, and acceptance rate of the first transportation provider. The processor 110 can calculate the delay score based on the first estimated arrival time, delay time, and acceptance rate of the first transportation provider if the difference between the estimated preparation time and the first estimated arrival time exceeds the predetermined third reference time. The delay score can be a score for the first transportation provider and the order pair. The delay score can be calculated using the following Equation 4.

$$S_{delay} = T_1 + B \times r_{acceptace} + C \times T_{late} \qquad \text{[Equation 4]}$$

where, $S_{delay}$ can be a delay score, $T_1$ can be an estimated arrival time of the transportation provider, $r_{acceptance}$ can be an acceptance rate of the transportation provider, and $T_{late}$ can be a delay time. B and C can be constants. The acceptance rate can be an intrinsic variable of the transportation provider, which can be a value determined based on the transportation provider's previous delivery history. The acceptance rate can be a variable that refers to the percentage of orders assigned to the transportation provider that the transportation provider has accepted for delivery. The delay time can mean the time taken to assign a transportation provider from the time the transportation provider was first detected (assign first try). The delay score can be a score that indicates how long an order will be delayed if it is assigned to a transportation provider. The higher the delay score, the more likely that the order will be delayed. The delay score can be expressed as a value between 0 and 100.

The processor 110 can determine, in operation 660, whether to assign the first transportation provider to the order based on the delay score. The processor 110 can assign the first transportation provider to the order if the calculated delay score exceeds a threshold score. The threshold score can be, for example, 70 points.

In some implementations, the processor 110 of the electronic device 100 can determine, for each of the plurality of identified transportation providers, whether the JIT rule (i.e., Equation 1 above) is satisfied. The processor 110 can then calculate the delay score (i.e., Equation 4 above) for each of the at least one transportation provider of the plurality of transportation providers that satisfies the JIT rule. The processor 110 can assign the transportation provider with the highest delay score among the at least one transportation provider to the order.

In some implementations, the processor 110 of the electronic device 100 can determine whether the JIT rule is satisfied for the first transportation provider closest to the service provider location among the plurality of identified transportation providers. If the first transportation provider does not satisfy the JIT rule, the processor 110 can determine whether the second transportation provider, who is second-closest to the service provider location, satisfies the JIT rule and the JIT complementary rule. If the second transportation provider does not satisfy the JIT rule or the JIT complementary rule, the processor 110 can calculate the delay score for the remaining transportation providers of the plurality of transportation providers, excluding the first and second transportation providers. The processor 110 can assign the transportation provider with the highest delay score among the remaining transportation providers to the order.

Example implementations of the present disclosure have been disclosed in the present specification and drawings. Although specific terms are used, these are only used in general meaning to easily explain the technical content of the present disclosure and to aid understanding of the present disclosure, but not intended to limit the scope of the present disclosure. It is obvious to those skilled in the art that other modified examples based on the technical idea of the present disclosure can be implemented in addition to the example implementations disclosed herein.

The "terminal" according to the above-described example implementations can be implemented as a computer or a portable terminal that can access a server or other terminal through a network. Here, the computer can include, for example, a notebook, a desktop, a laptop, and the like, equipped with a web browser, and the portable terminal is, for example, a wireless communication device that guarantees portability and mobility, which can include all kinds of handheld-based wireless communication device including communication-based terminals such as IMT (International Mobile Telecommunication), CDMA (Code Division Multiple Access), W-CDMA (W-Code Division Multiple Access), LTE (Long Term Evolution), smartphones, tablet PCs, and the like.

The apparatus or terminal according to the above-described example implementations can include a processor, a memory for storing and executing program data, a permanent storage such as a disk drive, a communication port for communicating with an external device, a user interface device such as a touch panel, a key, a button, or the like. Methods implemented as software modules or algorithms can be stored on a computer-readable recording medium as computer-readable codes or program instructions executable on the processor. Here, the computer-readable recording medium includes a magnetic storage medium (e.g., ROM (read-only memory), RAM (random-access memory), floppy disk, hard disk, etc.) and optical reading medium (e.g., CD-ROM and DVD (Digital Versatile Disc)). The computer-readable recording medium is distributed over networked computer systems, so that computer-readable codes can be stored and executed in a distributed manner. The medium is readable by a computer, stored in a memory, and executed on a processor.

The present example implementation can be represented by functional block configurations and various processing steps. These functional blocks can be implemented with various numbers of hardware or/and software configurations that perform specific functions. For example, the example implementation can employ an integrated circuit configuration such as memory, processing, logic, look-up table, or the like, capable of executing various functions by control of one or more microprocessors or other control devices. Similar to that components can be implemented with software programming or software elements, this example implementation includes various algorithms implemented with a combination of data structures, processes, routines or other programming components and can be implemented with a programming or scripting language including C, C++, Java, assembler, Python, etc. Functional aspects can be implemented with an algorithm running on one or more processors. In addition, the present example implementation can employ a conventional technique for at least one of electronic environment setting, signal processing, and data processing. Terms such as "mechanism", "element", "means", and "composition" can be used in a broad sense, and are not limited to mechanical and physical configurations. Those terms can include the meaning of a series of routines of software in connection with a processor or the like.

The above-described example implementations are merely examples, and other example implementations can be implemented within the scope of the claims to be described later.

What is claimed is:

1. A method of assigning a transportation provider by an electronic device, the method comprising:
- determining an estimated preparation time for a service provider to complete preparation for a request that is received from a terminal of a user;
- identifying a plurality of transportation providers based on a location of the service provider;
- determining a first estimated arrival time for a first transportation provider to arrive at the location of the service provider, the first estimated arrival time representing an earliest estimated arrival time among a plurality of estimated arrival times for the plurality of transportation providers;
- determining, based on the estimated preparation time and the first estimated arrival time, whether to assign the first transportation provider to the request;
- determining a second estimated arrival time for a second transportation provider to arrive at the location of the service provider; and
- determining, based on the estimated preparation time, the first estimated arrival time, and the second estimated arrival time, whether to assign the second transportation provider to the request,
- wherein determining whether to assign the first transportation provider to the request comprises:
  - determining whether a first difference between the estimated preparation time and the first estimated arrival time is less than or equal to a first reference time, and
  - based on a determination that the first difference is less than or equal to the first reference time, assigning the first transportation provider having the earliest estimated arrival time among the plurality of transportation providers to the request, and
- wherein determining whether to assign the second transportation provider to the request comprises:
  - determining whether a second difference between the estimated preparation time and the second estimated arrival time is less than or equal to the first reference time,
  - determining whether a third difference between the first estimated arrival time and the second estimated arrival time is less than or equal to a second reference time, and
  - based on a determination that (i) the second difference is less than or equal to the first reference time and (ii) the third difference is less than or equal to the second reference time, assigning the second transportation provider to the request.

2. The method of claim 1, wherein determining whether to assign the first transportation provider to the request further comprises:
- based on a determination that the first difference is greater than the first reference time, determining not to assign the first transportation provider to the request.

3. The method of claim 2,
- wherein the second estimated arrival time represents a second earliest estimated arrival time among the plurality of estimated arrival times.

4. The method of claim 3, wherein determining whether to assign the second transportation provider to the request further comprises:
- based on a determination that (i) the second difference is greater than the first reference time or (ii) the third difference is greater than the second reference time, determining not to assign the second transportation provider to the request.

5. The method of claim 3,
- wherein the first transportation provider is a transportation provider with a shortest distance to the location of the service provider among the plurality of transportation providers, and
- wherein the second transportation provider is a transportation provider with a second shortest distance to the location of the service provider among the plurality of transportation providers.

6. The method of claim 3, further comprising,
- based on a determination that the second transportation provider is not assigned to the request, reidentifying a plurality of transportation providers based on the location of the service provider.

7. The method of claim 1, wherein identifying the plurality of transportation providers comprises identifying transportation providers that are (i) located within a predetermined radius from the location of the service provider and (ii) in an idle state.

8. The method of claim 1, further comprising:
- determining an estimated arrival time for each of the plurality of transportation providers to arrive at the location of the service provider;
- based on the estimated preparation time, the estimated arrival time of each of the plurality of transportation providers, and a first reference time, determining not to assign, one or more transportation providers among the plurality of transportation providers, to the request; and based on the estimated preparation time and the estimated arrival time of each of remaining transportation providers, determining one transportation provider to be assigned to the request among the plurality of transportation providers excluding the one or more transportation providers.

9. The method of claim 1, further comprising:

identifying whether a first difference between the estimated preparation time and the first estimated arrival time is greater than a first reference time;

based on (i) the first difference between the estimated preparation time and the first estimated arrival time being greater than the first reference time, (ii) the first estimated arrival time, (iii) a delay time, and (iv) an acceptance rate of the first transportation provider regarding previous requests accepted for delivery, calculating a delay score; and based on the delay score, determining whether to assign the first transportation provider to the request.

10. The method of claim 1, wherein the first estimated arrival time is determined based on at least one of (i) a distance from the location of the service provider to a location of the first transportation provider, (ii) an average speed of the first transportation provider, (iii) characteristic information of the first transportation provider, (iv) characteristic information of a product corresponding to the request, (v) a current time, (vi) a current date, or (vii) traffic situation information.

11. The method of claim 1, wherein identifying the plurality of transportation providers comprises:

in response to a determination that the estimated preparation time is less than or equal to a threshold time, identifying the plurality of transportation providers based on the location of the service provider.

12. An electronic device comprising:

a memory storing instructions; and a processor configured to execute the instructions to perform operations comprising:

determining an estimated preparation time for a service provider to complete preparation for a request that is received from a terminal of a user, identifying a plurality of transportation providers based on a location of the service provider, determining a first estimated arrival time for a first transportation provider to arrive at the location of the service provider, the first estimated arrival time representing an earliest estimated arrival time among a plurality of estimated arrival times for the plurality of transportation providers, determining, based on the estimated preparation time and the first estimated arrival time, whether to assign the first transportation provider to the request, determining a second estimated arrival time for a second transportation provider to arrive at the location of the service provider, and determining, based on the estimated preparation time, the first estimated arrival time, and the second estimated arrival time, whether to assign the second transportation provider to the request, wherein determining whether to assign the first transportation provider to the request comprises:

determining whether a first difference between the estimated preparation time and the first estimated arrival time is less than or equal to a first reference time, and based on a determination that the first difference is less than or equal to the first reference time, assigning the first transportation provider having the earliest estimated arrival time among the plurality of transportation providers to the request, and wherein determining whether to assign the second transportation provider to the request comprises:

determining whether a second difference between the estimated preparation time and the second estimated arrival time is less than or equal to the first reference time, determining whether a third difference between the first estimated arrival time and the second estimated arrival time is less than or equal to a second reference time, and based on a determination that (i) the second difference is less than or equal to the first reference time and (ii) the third difference is less than or equal to the second reference time, assigning the second transportation provider to the request.

13. The electronic device of claim 12, wherein determining whether to assign the first transportation provider to the request further comprises:

based on a determination that the first difference is greater than the first reference time, determining not to assign the first transportation provider to the request.

14. The electronic device of claim 13, wherein the second estimated arrival time representing a second earliest estimated arrival time among the plurality of estimated arrival times.

15. The electronic device of claim 14, wherein determining whether to assign the second transportation provider to the request further comprises:

based on a determination that (i) the second difference is greater than the first reference time or (ii) the third difference is greater than the second reference time, determining not to assign the second transportation provider to the request.

16. A non-transitory computer-readable recording medium storing a program for executing a method of assigning a transportation provider on a computer, the method comprising:

determining an estimated preparation time for a service provider to complete preparation for a request that is received from a terminal of a user;

identifying a plurality of transportation providers based on a location of the service provider;

determining a first estimated arrival time for a first transportation provider to arrive at the service provider, the first estimated arrival time representing an earliest estimated arrival time among a plurality of estimated arrival times for the plurality of transportation providers;

determining, based on the estimated preparation time and the first estimated arrival time, whether to assign the first transportation provider to the request;

determining a second estimated arrival time for a second transportation provider to arrive at the location of the service provider; and determining, based on the estimated preparation time, the first estimated arrival time, and the second estimated arrival time, whether to assign the second transportation provider to the request, wherein determining whether to assign the first transportation provider to the request comprises:

determining whether a first difference between the estimated preparation time and the first estimated arrival time is less than or equal to a first reference time, and based on a determination that the first difference is less than or equal to the first reference time, assigning the first transportation provider having the earliest estimated arrival time among the plurality of transportation providers to the request, and wherein determining whether to assign the second transportation provider to the request comprises:

determining whether a second difference between the estimated preparation time and the second estimated arrival time is less than or equal to the first reference time, determining whether a third difference between the first estimated arrival time and the second estimated arrival time is less than or equal to a second reference time, and based on a determination that (i) the second difference is less than or equal to the first reference time and (ii) the third difference is less than or equal to the second reference time, assigning the second transportation provider to the request.

* * * * *